July 14, 1925.
J. J. BENTZ
EVENER
Filed Jan. 28, 1925
1,546,002
2 Sheets-Sheet 1
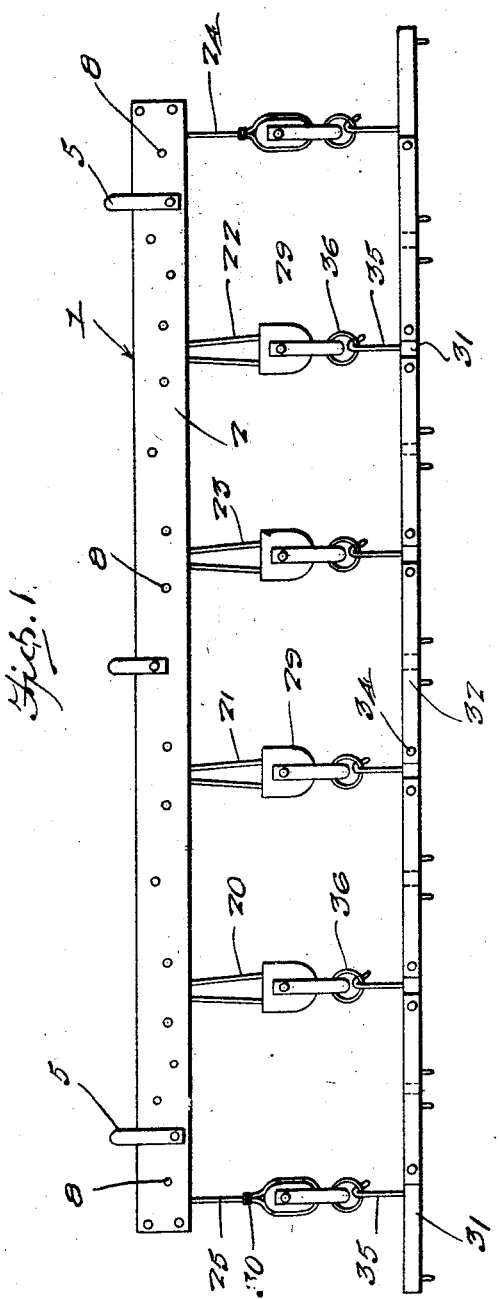
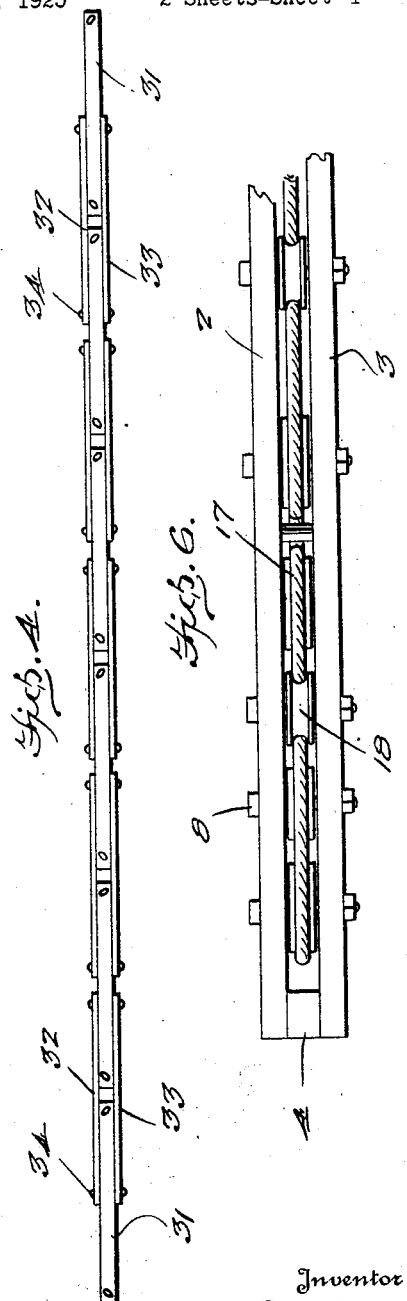
Inventor
J. J. Bentz
By Clarence O'Brien
Attorney

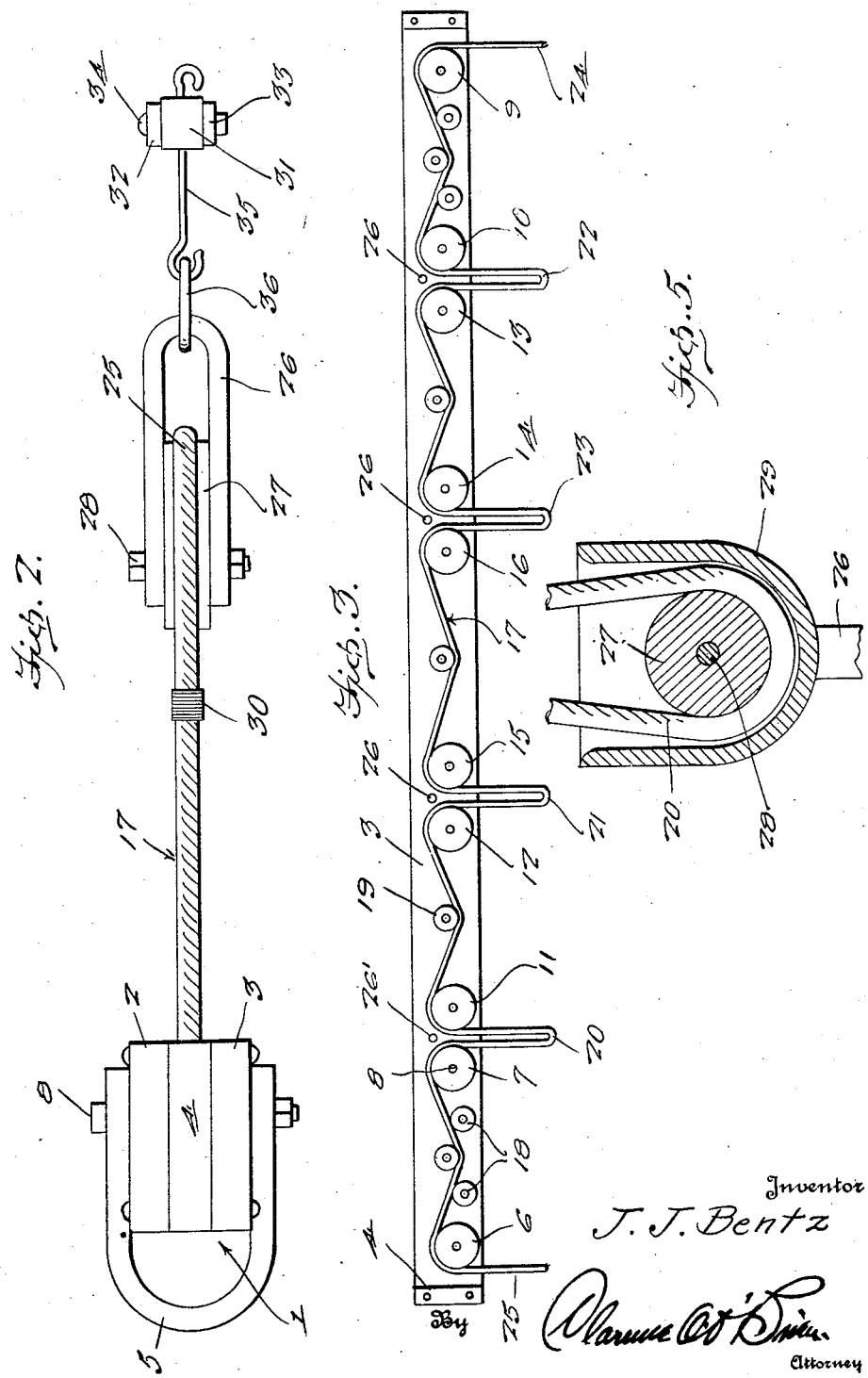

Patented July 14, 1925.

1,546,002

UNITED STATES PATENT OFFICE.

JACOB J. BENTZ, OF RAPID CITY, SOUTH DAKOTA.

EVENER.

Application filed January 28, 1925. Serial No. 5,280.

*To all whom it may concern:*

Be it known that I, JACOB J. BENTZ, citizen of the United States, residing at Rapid City, in the county of Pennington and State of South Dakota, have invented certain new and useful Improvements in an Evener, of which the following is a specification.

This invention relates to improvements in draft equalizers and has for its principal object to provide an evener whereby the pull will be equally distributed amongst the several horses connected to the draft bar.

Another important object is to provide an evener of the above mentioned character, which will at all times be positive and efficient in its operation, the same being further simple in construction inexpensive, and furthermore adapted for the purposes for which the same is designed.

Other objects and advantages of this invention will become apparent during the course of the following description.

In the accompanying drawing forming part of this specification and in which like numerals designate like parts throughout the same:

Figure 1 is a top plan view of the evener embodying my invention.

Fig. 2 is a side elevation.

Fig. 3 is a top plan view of the draft bar with the upper section removed showing the arrangement of the pulleys in the flexible cable.

Fig. 4 is a front view of the interconnected singletrees.

Fig. 5 is a sectional view through one of the clevises, and

Fig. 6 is a fragmentary enlarged front elevation of the draft bar.

In the drawings wherein for the purpose of illustration is shown the preferred embodiment of my invention, the numeral 1 designates generally an enlongated draft bar, the same comprising the upper and lower sections 2 and 3. The sections are secured in spaced relation through the medium of the spacing block 4, the same being arranged at the respective ends of the sections as clearly illustrated in the drawings.

The draft bar 1 is adapted to be supported on the wagon or implement to be drawn by the animals through the medium of the attaching clevises 5, any number of which may be provided as necessary.

A pair of grooved pulleys 6 and 7 are supported in spaced relation between the upper and lower sections of the draft bar and one end thereof through the medium of the supporting pins 8 which extends vertically through the upper and lower sections. A similar pair of grooved pulleys 9 and 10 respectively are arranged between the upper and lower sections of the draft bar at the opposite ends thereof.

Additional pairs of pulleys 11 and 12, 13 and 14, and 15 and 16 respectively are supported on similar vertically disposed pins between the upper and lower sections of the draft bar, said pairs of grooved pulleys being arranged in spaced relation with respect to each other. The purpose of this arrangement will also be hereinafter more fully described.

An elongated flexible element such as cable or rope and designated generally by the numeral 17 is adapted to extend over the various pairs of grooved pulleys, a plurality of guide pulleys such as are shown at 18 being associated with each of the end pair of pulleys, while a guide pulley such as illustrated at 19 is associated with each of the remaining pairs of the grooved pulleys. The guide pulleys cooperate with the portions of each cable or rope in the manner clearly illustrated in Fig. 3. The portion of the cable which is disposed between the pulley 7 and the pulley 11 is disposed forward of the draft bar as is illustrated at 20. In a similar manner the portion of the flexible cable which is disposed between the pulley 12 and the pulley 15 is also extended forward of the draft bar as illustrated at 21. The portions of the cable which extend forward from the draft bar and are disposed between the pulleys 10 and 13, and the pulleys 14 and 16 respectively are designated by the numerals 22 and 23 respectively.

The respective ends 24 and 25 of the flexible cable are also disposed forward of the draft bar as illustrated in Fig. 3. Suitable stop pins 26' extend vertically between the upper and lower sections of the draft bar at points adjacent the adjacent pulleys of the several pairs and the same providing means for limiting the movement of the looped portions 20, 21, 22 and 23 respectively of these cables in the opposite or rearward direction.

Cooperating with each of the forward disposed portions of the flexible cable is a substantially U-shaped clevis 26. A grooved pulley 27 is supported on the bolt 28 between the outer free ends of the arms of the U-shaped clevises, the bolt 28 extending through the registering openings provided therefor in the free ends of the arms of each clevis.

The looped portions of the intermediate forward disposed portions of the flexible cable are disposed around the respective pulleys as clearly illustrated in Fig. 5. If desired, suitable housings such as are shown at 29 may be provided in connection with the intermediate clevises and the pulleys associated therewith as clearly illustrated in Fig. 1.

The free ends 24 and 25 of the flexible cables are disposed around the pulleys supported in the end clevises and are secured as illustrated at 30.

A series of singletrees 31 are interconnected with each other by means of connecting bars 32 and 33 respectively, the same being pivotally secured at the respective ends to the intermediate portions of the adjacent singletrees as at 34. The bars 32 are disposed on the upper faces of the singletrees while the bars 33 are secured on the lower faces thereof. This construction is more clearly illustrated in Fig. 4 of the drawings. Each of the singletrees is provided with a rearwardly extending hook 35 the same being adapted for detachable engagement with a ring 36 carried by the respective clevises.

In the present instance, I have shown six clevises and six singletrees, whereby six animals may be attached to the evener, although it is to be understood that any number of singletrees and clevises therefor may be provided as is desired.

The provision of an evener of the above mentioned character, will cause the pull to be distributed equally amongst the six animals thereby rendering the device very efficient in carrying out the purposes for which the same is designated.

Furthermore the simplicity in which the present evener is constructed, enables the singletree to be readily attached or detached from the clevises with the loss of any considerable length of time or labor.

While I have shown the preferred embodiment of my invention, it is to be understood that by changes in the size, shape and arrangement of parts may be resorted to without departing from the spirit of the invention and the scope of the appended claims.

Having thus described my invention, what I claim as new is:—

1. An evener of the class described comprising an elongated draft bar, the same including upper and lower spaced sections, a series of pulleys arranged between said spaced sections, a flexible cable extending over said pulleys, portions thereof being disposed forward of the draft bar, and interconnected singletrees detachably secured to the respective forward disposed portions of the cable.

2. An evener of the class described comprising an elongated draft bar, the same including spaced upper and lower sections, a pair of pulleys arranged between the spaced sections adjacent each end of the draft bar, additional pairs of pulleys arranged between the spaced sections and disposed in spaced relation with respect to the end pairs and with respect to each other, a flexible cable extending over the pulleys of each pair, the portion of the cable between each pair being disposed forward, the respective ends of the cable being disposed forward of the draft bar, and interconnected singletrees detachably secured to the respectively forward disposed portions of the cable.

3. An evener of the class described comprising an elongated draft bar, the same including spaced upper and lower sections, a pair of pulleys arranged between the spaced sections adjacent each end of the draft bar, additional pairs of pulleys arranged between the spaced sections and disposed in spaced relation with respect to the end pairs and with respect to each other, a flexible cable extending over the pulleys of each pair, the portion of the cable between each pair being disposed forwardly, the respective ends of the cable being disposed forward of the draft bar, a plurality of clevises for the respective forwardly disposed portions of the cable, pulleys associated with the clevises for said forwardly disposed portions of the cable, a series of interconnected singletrees, and means for detachably securing the same to the respective clevises.

4. An evener of the class described comprising an elongated draft bar, the same including spaced upper and lower sections, a pair of pulleys arranged between the spaced sections adjacent each end of the draft bar, additional pairs of pulleys arranged between the spaced sections and disposed in spaced relation with respect to the end pairs and with respect to each other, a flexible cable extending over the pulleys of each pair, the portion of the cable between each pair being disposed forwardly, the respective ends of the cable being disposed forward of the draft bar, a plurality of clevises for the respective forwardly disposed portions of the cable pulleys associated with the clevises for said forwardly disposed portions of the cable, a series of interconnected singletrees, means for detachably securing the same to the respective clevises, said means comprising a hook extending rearwardly from each of the singletrees, and a ring carried by each clevis for cooperation with the respective hooks.

In testimony whereof I affix my signature.

JACOB J. BENTZ.